Nov. 26, 1968                 M. DJURAGIN                 3,412,987
THERMOCONVERTER RUN WITH UNIVERSAL FUEL FOR
THE PRODUCTION OF PURE AIR
Filed July 13, 1966
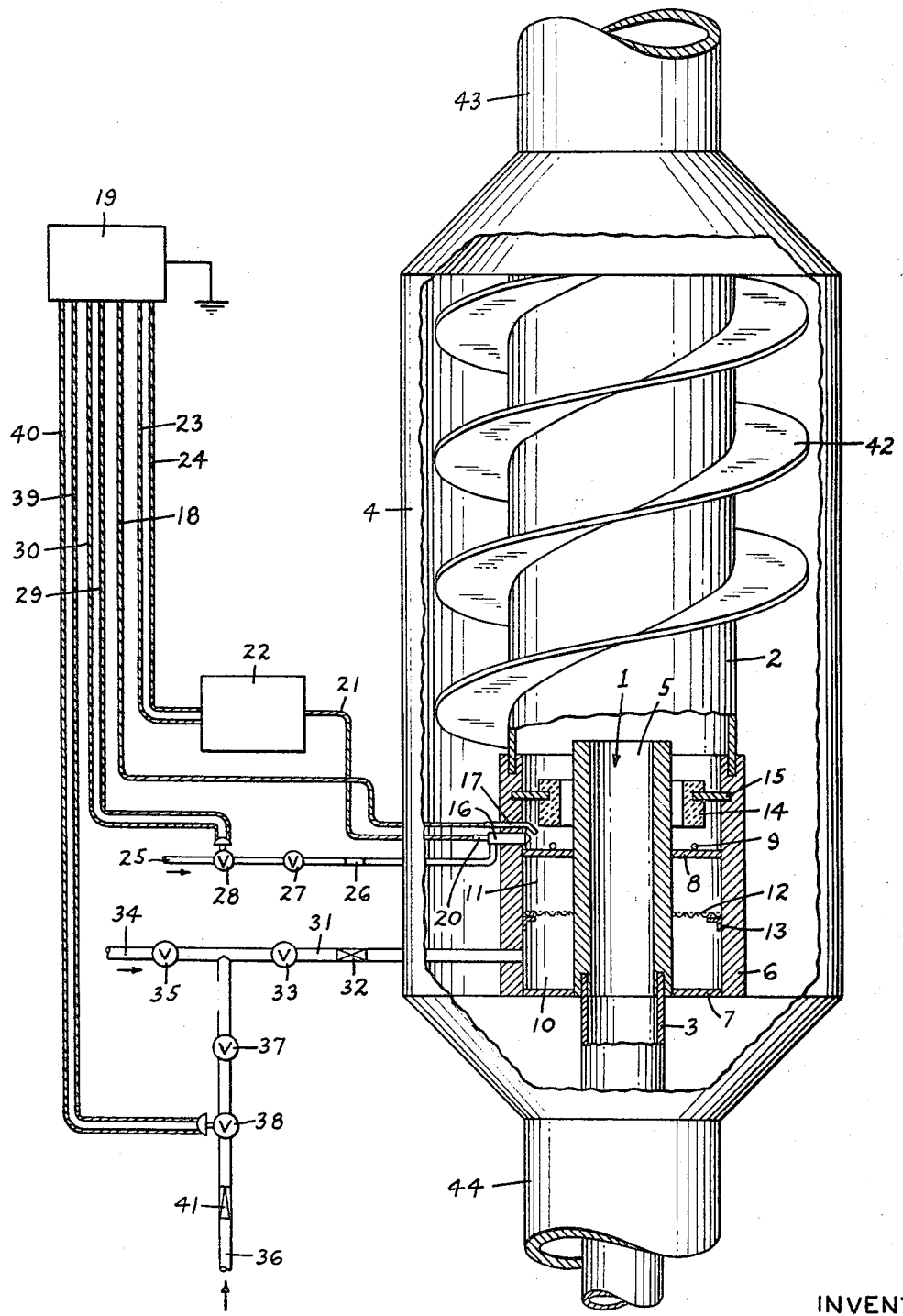
INVENTOR
MARCO DJURAGIN
BY
ATTORNEY

3,412,987
THERMOCONVERTER RUN WITH UNIVERSAL FUEL FOR THE PRODUCTION OF PURE AIR
Marco Djuragin, Sao Paulo, Brazil, assignor of one-half to Maximilian Linker
Filed July 13, 1966, Ser. No. 564,833
Claims priority, application France, Sept. 28, 1965, 32,802
9 Claims. (Cl. 263—19)

ABSTRACT OF THE DISCLOSURE

The present invention which relates to a thermoconverter structurally comprises a large diameter cylinder having a smaller diameter cylinder set therein. A combustion chamber is formed between the large and small diameter cylinders and a screen separates a lower section from an upper section of the combustion chamber. A series of burners are provided in the large diameter cylinder walls and are in turn connected to a control panel for varying the degree of combustion required within the combustion chamber. Firebrick walls are provided above the series of burners and are supported on the large diameter cylinder. An air cylinder is provided in communication with the small diameter cylinder for the introduction of air thereinto. The entire combustion chamber structure is internally connected to a large external cylinder and a spiral ribbed cylinder is connected to the upper end of the large diameter cylinder. With this structure affords the heating of air with any fuel free of contact with the air from which comes out of the converter.

---

The present invention relates to a thermoconverter.

Hot air is indispensable in almost all industrial processes, as well as in many other applications.

Hot air is produced by many equipments, which give, all of them, very costly results, regarding the initial investment as well as the maintenance, producing, in many cases an air which contains combustion residues and other harmful impurities.

It is possible to produce pure air, free of soot, heated to approximately between 80 and 600° C. through the thermoconverter of the present invention which is heretofore described, being this thermoconverter very economical from the point of view of the initial investment, of the installation and of the fuel consumption; besides it has an extremely wide field of applications due to the possibility of running with any fuel and the easiness of assembly in any machine or other installation.

In the figure shown the thermoconverter is represented in a vertical cut. The thermoconverter is constituted by: a combustion chamber, indicated in the drawing by the number 1; an internal cylinder 2 provided with ribs; an internal air duct tube 3; and an external cylinder 4.

The combustion chamber 1 is constituted by two cylinders, the internal one 5 and the external one 6, which are situated one within the other, while the space between them is closed at the bottom part by a steel ring 7, and under the top border, by the steel ring 8 above which is assembled a series of gas burners 9. The combustion chamber is divided horizontally, in two parts, the lower one 10 and the upper one 11, by the screen 12, which rests on the brackets 13. Over the gas burners 9 is assembled the cylinder of firebrick 14 which is kept in position by the brackets 15.

The objects of the present invention are achieved by providing a thermoconverter run with universal fuel for the production of pure air comprising an external cylinder and an internal cylinder, a combustion chamber disposed within said internal cylinder, said external cylinder being provided with an upper end and a lower end, an air inlet disposed at the lower end of said external cylinder and an outlet disposed at the upper end of said external cylinder.

In the external cylinder 6 of the combustion chamber 1, right above the upper steel ring 8 are the burner 16 and the electrode 17, the last one being connected to the control panel 19 by the cable 18. Over the burner 16 the following parts are assembled:

The spark-plug 20 which is connected, by the cable 21 to the transformer 22, and this one is connected by the cables 23 and 24 to the control panel 19; and the gas duct 25 on which are assembled in turn, the venturi 46, the manual valve 27 and the automatic valve 28; the last one being connected by the cables 29 and 30 to the control panel 18.

In the lower part 10 of the combustion chamber 1 emerges the common duct for the mixture of air and gas 31, and on it the safety valves 32 and the manual valve 33 are assembled. The main duct 31 is connected to the air duct 34, on which is locted the manual valve 35, and to the gas duct 36 on which are assembled the manual valve 37 and the automatic valve 38 and this one is connected to the control panel 19 by the cables 39 and 40 and, finally, the pressure reducer 41.

The internal cylinder 2, provided with ribs, is assembled on the upper end of the external cylinder 6 of the combustion chamber 1. On the external wall of the cylinder 2, in its total length, the spiral ribs 42 are fixed.

The internal tube of the air duct 3 is asembled on the lower end of the internal cylinder 5 of the combustion chamber 1. Within the external cylinder 4 there are: the combustion chamber 1, the internal cylinder 2 with ribs, and the internal air duct 3. The external cylinder 4 ends at the top part by the outlet 43, and at the bottom by the intake 44, through which center passes the internal air duct 3.

The running of the thermoconverter is described next. The mixture of air and fuel gas (butane, metane or industrial gas) enters, through the main duct 31, at the lower part 10 of the combustion chamber 1, passes (through the screen 12) to the top part 11, forcing, in this way, a more intimate mixture and finally, leaving through the gas burners 9, burns with a flame in the direction towards the firebrick cylinder 14; the scope of this is to make the flame stable and to favor, in this way, a total combustion of the fuel. The combustion products touch the internal and external walls of the firebrick cylinder 14 and rise through the internal cylinder 2 heating it. The proportion of the mixture is achieved through the manual valve 33, which is placed on the common duct 31, in such a way that, if necessary, it is possible to reduce or to increase the production capacity.

The air is introduced through the tube 34, and the proportion of mixture is done by the manual valve 35. The gas is introduced through the duct 36; the gas pressure is regulated by the pressure reducer 41 in order to adapt it to the pressure of the air that comes through the duct 34; the proportion of the gas mixture is done by means of the manual valve 37.

The passage of the gas is controlled by the automatic valve 38, connected to the control panel 19. In case that the flame of the burner 16 goes out, this will be indicated by the electrode 17 on the control panel 19, with the simultaneous closing of the automatic valve 38 of the gas duct 36 and of the automatic valve 28 on the gas duct 25 of the burner 16. In this way any entrance of gas into the thermoconverter is prevented. By means of the manual valve 27, placed on the gas duct 25 of the burner 16, the opening and closing of the gas is done. The venturi 26, mounted on the gas duct 25 of the burner 16, assures the mixture of air and gas in the mentioned way. The spark plug 20 placed on the burner 16, and which receives high tension from the transformer 22, provides the spark and the automatic ignition of the burner 16.

The air which is to be heated enters in the thermoconverter through the inlet 44 and through the internal air duct 3. The portion of air that passes through the tube 3, entering into the internal cylinder 5 of the combustion chamber 1, touches the heated walls of the cylinders 5 heating itself and rising to the top, in the cylinder 3, where it is mixed with the combustion products. This heated mixture will heat the internal cylinder 2 and, finally, leaves mixing with the circulating air in the external cylinder 4.

The portion of the air which enters into the external cylinder 4 through the inlet 44 touches the heated walls of the external cylinder 6 of the combustion chamber 1 and, so heated, continues until the top, reaches the spiral ribs 42, which force it around the internal cylinder 2, and by this means the air is heated due to the large contact surface. The ideal mixture of air that circulates within the external cylinder 4, with the mixture of air and combustion products that come out from the internal cylinder 2, is obtained due to the circular movement given by the spiral ribs 42. Finally, the mixture, which contains nothing more than carbonic oxide and water vapor, heated to the desired temperature by the regulation of the valves 37 and 35, mounted respectively on the gas duct 36 and on the air duct 34, leaves the thermoconverter through the outlet 43 and is directed to the desired place.

In some cases, due to the presence of flammable materials, there is the possibility that impurities which may be eventually introduced with the air, and which may have become incandescent due to the contact with the flames, may land on flammable substances causing accidents. Therefore, it is provided in the thermoconverter that the air which passes through the internal cylinder 2 and the internal duct 3 may be put into a closed circuit system, by means of additional tubes mounted on the cylinder 2 and the tube 3, without any contact with the air which circulates in the external cylinder 4 and which leaves the thermoconverter.

By means of this system of air circulation the indirect heating of the thermoconverter is easily done, using any fuel, by passing some additional tubes, mounted in the internal cylinder 2 and the internal air duct 3, through a stove which can be fed with wood, coal, naphtha, etc. The heated air circulates through the converter through the internal tube 3 and the internal cylinder 2, heating them and so transmitting the heat to the air that circulates through the external cylinder 4.

The advantage of the thermoconverter run by universal fuel in the production of pure air consists of the fact that it can run with any fuel, while the air remains always pure and without residues, in such a way that it is possible to use it even when it is necessary to have air completely free of harmful impurities for several processes.

In the case it is run by gas, the thermoconverter offers the following advantages: it is possible to heat the air mixing it directly with the combustion products, resulting, in this way, an extremely high thermal yield; the combustion is complete, without impurities, and it is done in a combustion chamber which operation is stable and safe; the operation of the combustion chamber is such that it does not form combustion residues (soot) either during the firing phase or during the interruption of the activities, in such a way that the heated air remains pure during the whole running cycle. Another advantage is the fact that, for the firing, it is not necessary for the introduction of any flame into the thermoconverter, the firing being done in the above mentioned way, in a completely automatic way; therefore soot is not introduced in the air and the danger of igniting flammable materials does not exist.

It is possible to assemble the thermoconverter very easily on any machine which needs hot air; besides, due to the fact that the thermoconverter is easily introduced in the machinery we won't have heat losses.

The thermoconverter is provided with the showed characteristics and, on the other hand, it is economical from the point of view of production; in each case, it consumes a minimum quantity of fuel, its operation assures complete safety and, besides it does not require labour.

I claim:

1. A thermoconverter run with universal fuel for the production of pure air comprising an external cylinder and an internal cylinder, a combustion chamber disposed within said internal cylinder, said external cylinder being provided with an upper end and a lower end, a control panel remote from said combustion chamber adapted to control the combustion in said chamber, an air inlet disposed at the lower end of said external cylinder, and an outlet disposed at the upper end of said external cylinder.

2. A thermoconverter according to claim 1 wherein said combustion chamber is comprised of two cylinders of different diameters disposed one within the other and having a space therebetween said space between the cylinders being closed at the lower part by a steel ring, said space between the cylinders being closed at the upper part by a second steel ring, each of said rings being supported by a plurality of brackets, a series of gas burners communicating with the larger diameter cylinder, a screen disposed in said space dividing said space into a lower part and an upper part, and a common duct for mixing air and fuel gas communicating with said lower part of said space.

3. A thermoconverter according to claim 2 wherein a series of gas burners is mounted above said second steel ring and a firebrick cylinder is disposed thereabove for making the burner flames stables and for aiding in the total combustion of the fuel.

4. A thermoconverter according to claim 3 wherein said burners are mounted within said larger diameter cylinder and each of said burners is provided with a spark plug, a control panel connected to said spark plug, and a gas duct communicating with said spark plug.

5. A thermoconverter according to claim 4 wherein the larger diameter cylinder of the combustion chamber has mounted therein an electrode which is connected to the control panel, and controls the flame in said combustion chamber.

6. A thermoconverter according to claim 5 wherein an automatic valve is mounted within said gas ducts and connected to said control panel so that gas automatically exits.

7. A thermoconverter according to claim 6 wherein the proportion of the fuel mixture is done by valves located on said gas duct and on said air duct, respectively, and by a valve located on the common duct for fuel mixture.

8. A thermoconverter according to claim 7 wherein the internal cylinder is mounted on the upper border of the larger diameter cylinder of the combustion chamber and is provided with spiral ribs for the purpose of giving circular motion to the air which rises in the external cylinder.

9. A thermoconverter according to claim 8 wherein the air which is going to be heated is introduced in part through an internal air duct mounted on the lower end of the smaller diameter cylinder of the combustion chamber, and located in the center of the air inlet of the external cylinder affording a double circulation within the thermoconverter, with which it is possible to obtain a closed circulation of air, heated with any fuel, free of contact with the air which comes out from the converter.

References Cited

UNITED STATES PATENTS

| | | | |
|---|---|---|---|
| 1,629,921 | 5/1927 | Mansfield | 263—19 |
| 1,953,590 | 4/1934 | Cone | 158—110 |
| 3,273,621 | 9/1966 | Childree | 263—19 |

JOHN J. CAMBY, *Acting Primary Examiner.*